United States Patent

Nonaka

Patent Number: 5,431,497
Date of Patent: Jul. 11, 1995

[54] TRACK RAIL FIXING STRUCTURE AND A LINEAR MOTION GUIDE UNIT ON WHICH IT IS EQUIPPED

[75] Inventor: Toshihiko Nonaka, Kanagawa, Japan

[73] Assignee: Nippon Thompson Co., Ltd., Tokyo, Japan

[21] Appl. No.: 221,791

[22] Filed: Apr. 1, 1994

[30] Foreign Application Priority Data

Apr. 16, 1993 [JP] Japan ................... 5-025361

[51] Int. Cl.[6] ............................................. F16C 29/06
[52] U.S. Cl. ..................................................... 384/45
[58] Field of Search .............................. 384/45, 43, 44; 464/168

[56] References Cited

U.S. PATENT DOCUMENTS

| | | | |
|---|---|---|---|
| 5,273,367 | 12/1993 | Tanaka | 384/45 |
| 5,281,028 | 1/1994 | Morita | 384/45 |
| 5,326,335 | 7/1994 | Takei | 384/45 |
| 5,380,097 | 1/1995 | Tanaka | 384/45 |

*Primary Examiner*—Lenard A. Footland
*Attorney, Agent, or Firm*—Sughrue, Mion, Zinn, Macpeak & Seas

[57] ABSTRACT

A track rail fixing structure and a linear motion guide unit on which it is equipped are disclosed that are able to improve the straightness of a track rail in any direction. This effect is obtained by juxtaposing an intervening member between a reference surface formed on one clamping member and the corresponding flange of the track rail by press fitting.

6 Claims, 5 Drawing Sheets

TRACK RAIL FIXING STRUCTURE AND A LINEAR MOTION GUIDE UNIT ON WHICH IT IS EQUIPPED

BACKGROUND OF THE INVENTION

1. Field of the Invention

The present invention relates to a track fixing structure for fixing a track rail to a prescribed base, such as the bed of a machine tool, and a linear motion equipped with said fixing structure.

2. Description of the Prior Art

Heretofore, fixing of a track rail equipped on a linear motion guide unit was normally performed by forming a plurality of bolt insertion holes along the lengthwise direction of the track rail itself, and fastening by screwing bolts inserted into each of said bolt insertion holes into the bed of a machine tool and so forth. However, in this fixing method, due to deformation of the vicinity of the above-mentioned bolt insertion holes of the track rail caused by fastening of the bolts, waviness formed in the track rail thus preventing the track rail from being straight.

A known example of a fixing structure that solves this problem is shown in FIG. 1. Furthermore, said fixing structure is disclosed in Utility Model Laid-Open Publication No. 4-70437, and said publication discloses an example that is used for fixing a track rail of a linear motion rolling guide unit.

As shown in the drawing, said linear motion rolling guide unit is equipped with track rail 1, in which two track grooves 1a each are formed along the lengthwise direction on the left and right sides, a slider in the form of sliding unit 3 able to move relative to track rail 1 and in which rolling element circulating path 2 is formed corresponding to these track grooves 1a, and a large number of balls 4 arranged and contained within rolling element circulating path 2 that bear the load by circulating while rolling over the above-mentioned track grooves 1a accompanying movement of sliding unit 3.

Flange 1d, having tapered surface 1c for its upper surface, which gradually widens towards bottom mounting surface 1b, is formed on both sides of the bottom portion of track rail 1. Said track rail 1 is placed on bottom surface 5b, namely a reference surface, of groove 5a, having a roughly rectangular cross-section, formed in a prescribed base 5, such as the bed of a machine tool.

A pair of clamping members 6 and 7 are provided within the above-mentioned groove 5a so as to sandwich track rail 1 from both sides, and are fastened to base 5 by bolts 8.

Contact surfaces 6a and 7a are formed in each of the outsides of both clamping members 6 and 7. Together with these making contact with reference surfaces in the form of both left and right inside surfaces 5c and 5d of the above-mentioned groove 5a, tapered surfaces 6b and 7b, which make contact with tapered surfaces 1c of track rail 1, are formed on the insides.

In the fixing structure of the above-mentioned construction, tightening of bolts 8 results in the formation of wedging action by track rail 1 and both clamping members 6 and 7 on both tapered surfaces, thereby resulting in positioning and fixing of track rail 1.

In the construction of the prior art as described above, the tightening force for bolts 8 is applied to track rail 1 through clamping members 6 and 7.

In said construction, although the straightness of track rail 1 in the vertical direction can be obtained at a high level by the action of a reference surface in the form of bottom surface 5b of groove 5a, since positioning in the horizontal direction is performed only by the frictional engagement of track rail 1 and each tapered surface of clamping members 6 and 7, said positioning is relatively unstable. Since force in the horizontal direction becomes locally strong at the locations of bolts 8, waviness forms in track rail 1 in the horizontal direction, thus resulting in the disadvantage of it being difficult to improve straightness in said horizontal direction.

SUMMARY OF THE INVENTION

In consideration of the above-mentioned disadvantage of the prior art, the object of the present invention is to provide a track rail fixing structure able to improve the straightness of a track rail in all directions, and a linear motion guide unit equipped with said fixing structure.

The present invention consists of track rail fixing structure for fixing a track rail, in which flanges, having tapered surfaces that gradually widen towards a bottom mounting surface, for their upper surfaces are provided on both sides of its bottom portion, within a groove having a roughly rectangular cross-section formed in a prescribed base; having: a pair of clamping members arranged on both sides of said track rail, wherein together with contact surfaces that make contact with the left and right inside surfaces of said groove being formed in each of the outsides, tapered surfaces that make contact with said tapered surfaces are formed on the insides; a fastening device that fastens said clamping members to said base; and, an intervening member juxtapositioned between one of the reference surfaces of either of said clamping members and said flanges by press fitting.

In addition, the present invention consists of a linear motion guide unit equipped with: a track rail, in which flanges, having tapered surfaces that gradually widen towards a bottom mounting surface, for their upper surfaces are provided on both sides of its bottom portion; a slider that moves relative to said track rail; and, a track rail fixing structure for fixing said track rail within a groove having a roughly rectangular cross-section formed in a prescribed base; wherein, said track rail fixing structure has: a pair of clamping members arranged on both sides of said track rail, wherein together with contact surfaces that make contact with the left and right inside surfaces of said groove being formed in each of the outsides, tapered surfaces that make contact with said tapered surfaces are formed on the insides; a fastening device that fastens said clamping members to said base; and, an intervening member juxtapositioned between one of the reference surfaces of either of said clamping members and said flanges by press fitting.

DESCRIPTION OF THE PREFERRED EMBODIMENTS

Figure 1:
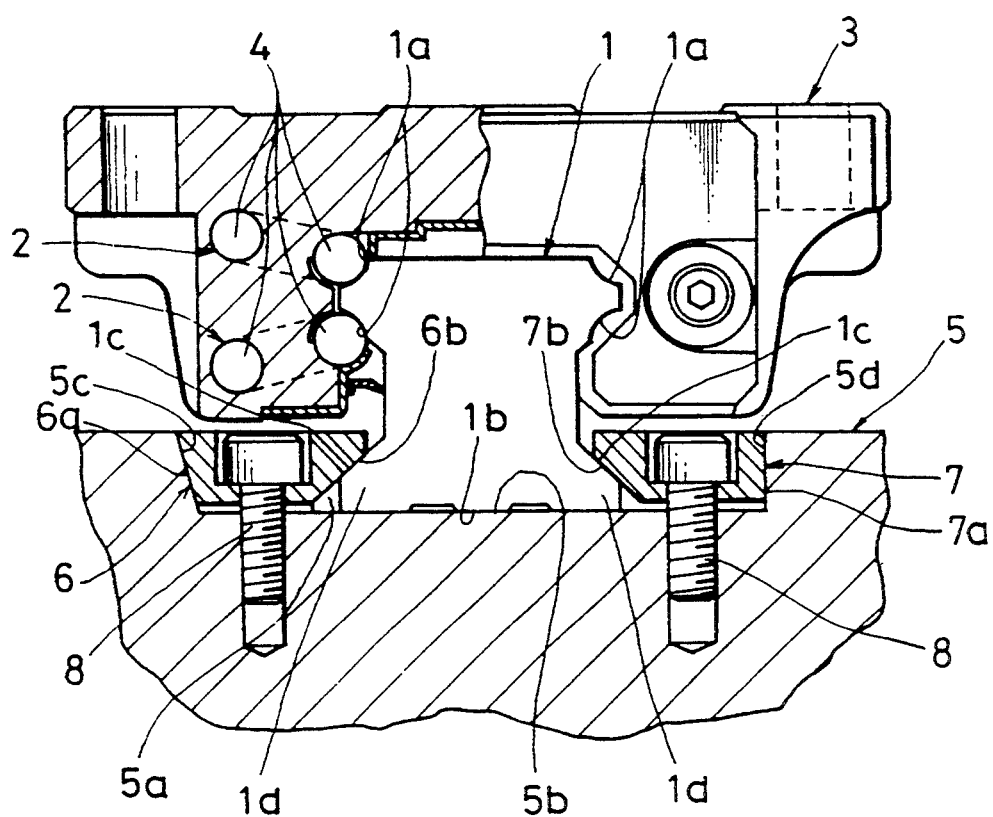
FIG. 1 is a longitudinal cross-sectional view of a linear motion rolling guide unit of the prior art mounted on a prescribed base.

The following provides an explanation of the preferred embodiments of the linear motion rolling guide unit of the present invention with reference to the attached drawings.

As shown in FIGS. 2 through 5, said linear motion rolling guide unit is composed of track rail 11, in which one track each in the form of track groove 11a is formed along the lengthwise direction in both the left and right sides, a slider in the form of sliding unit 13 that moves relative to this track rail and has rolling element circulating path 12 (to be later described in detail), and a large number of rolling elements in the form of balls 14 arranged and contained within said rolling element circulating path 12, and which bear the load between track rail 11 and sliding unit 13 by circulating while rolling over said track grooves 11a accompanying movement of sliding unit 13.

Figure 3:
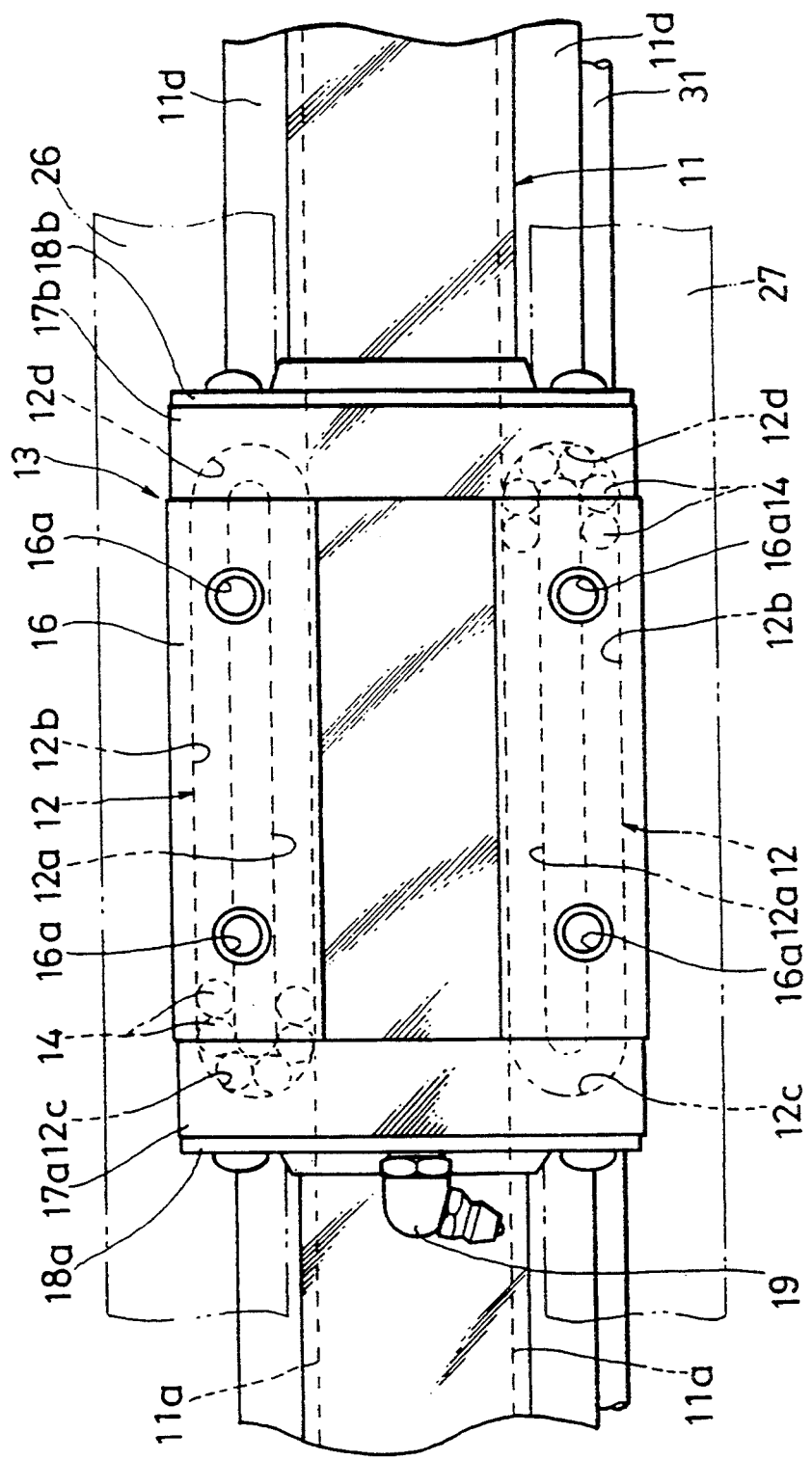
FIG. 3 is a top view of the essential portion of the linear motion rolling guide unit shown in FIG. 2.
Figure 4:
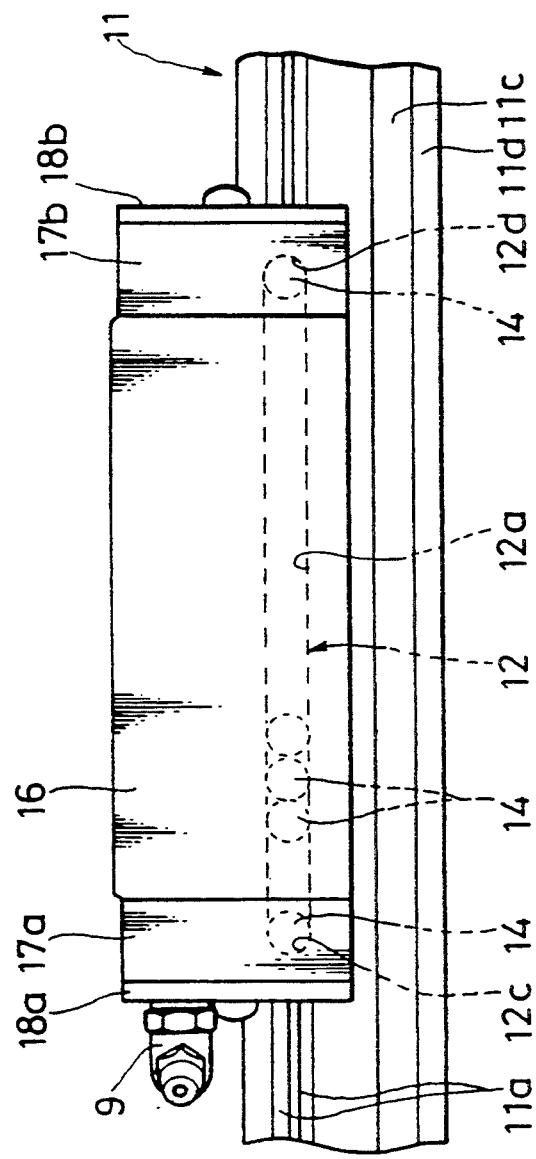
FIG. 4 is a side view of the essential portion of the linear motion rolling guide unit shown in FIG. 2.
Figure 5:
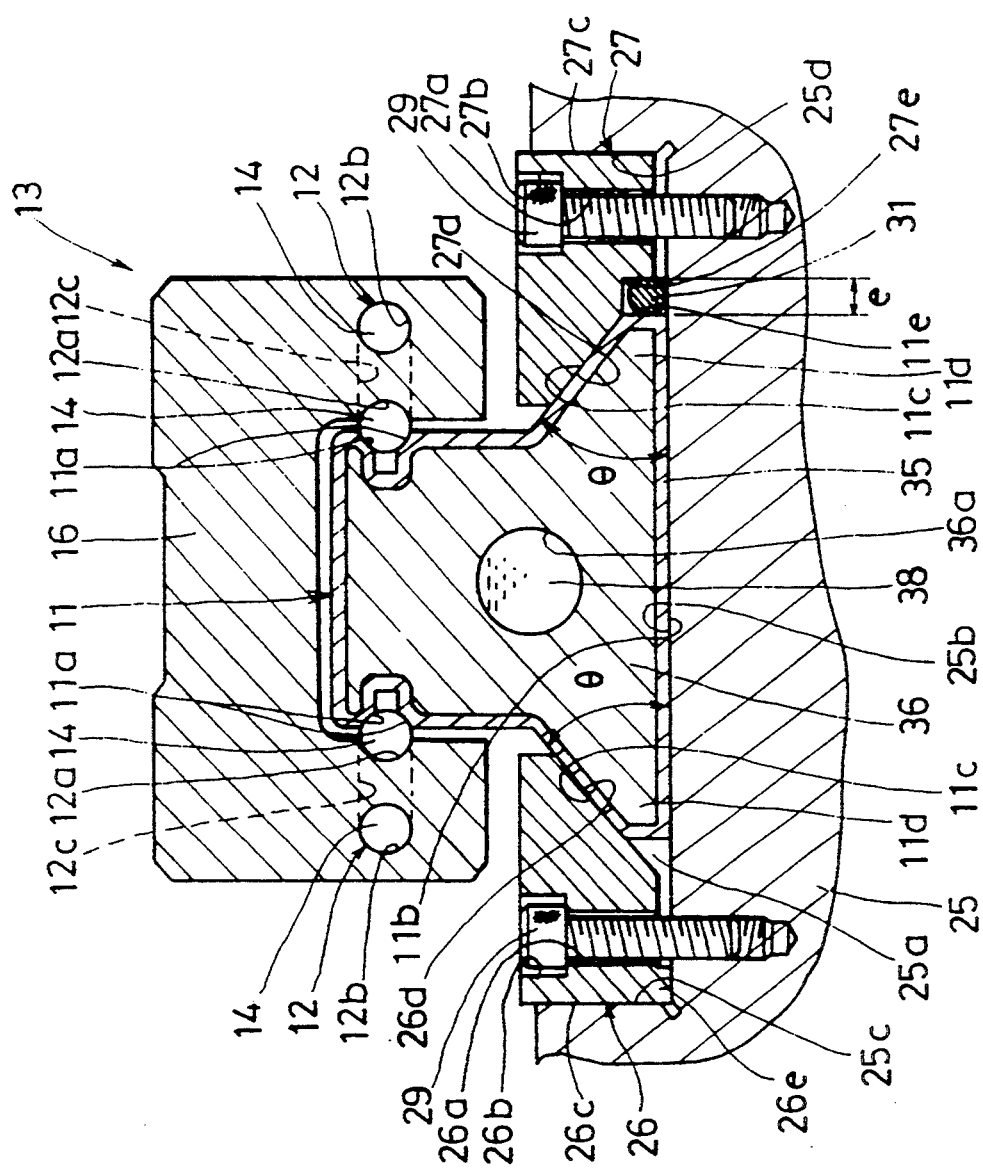
FIG. 5 is a longitudinal cross-sectional view showing the linear motion rolling guide unit as claimed in the present invention mounted on a prescribed base.

Sliding unit 13 has casing 16, provided so as to straddle track rail 11, a pair of end caps 17a and 17b which are coupled to both the front and back ends of said casing 16, and two seals 18a and 18b attached to each of the outer surfaces of said end caps 17a and 17b. Furthermore, grease nipple 19 is attached to end cap 17a for supplying grease to the above-mentioned balls 14. As shown in FIGS. 3 through 5, rolling element circulating path 12 is composed of load bearing track groove 12a and return path 12b, each formed linearly and mutually in parallel in casing 16, and a pair of roughly semicircular direction changing paths 12c and 12d formed in both end caps 17a and 17b and which connect said load bearing track groove 12a and return path 12b at both of their ends. Furthermore, the above-mentioned load bearing track groove 12a corresponds to track groove 11a of track rail 11.

The linear motion rolling guide unit having the above-mentioned construction is arranged on a prescribed base 25 (shown in FIGS. 2 and 5) in the form of the bed of a machine tool and so forth, and track rail 11 is fixed to said base 25. A table for holding a workpiece and so forth (not shown) is bolted to sliding unit 13, with this then operating as the moving side. Namely, a workpiece and so forth placed on said table is reciprocated by a driving device not shown. Furthermore, a plurality of threaded holes 16a are formed in the upper surface of casing 16 of sliding unit 13, and the above-mentioned table is fastened to sliding unit 13 by bolts (not shown) screwed into these threaded holes 16a.

The following provides an explanation of the fixing structure for fixing track rail 11 to the above-mentioned base 25.

Figure 2:
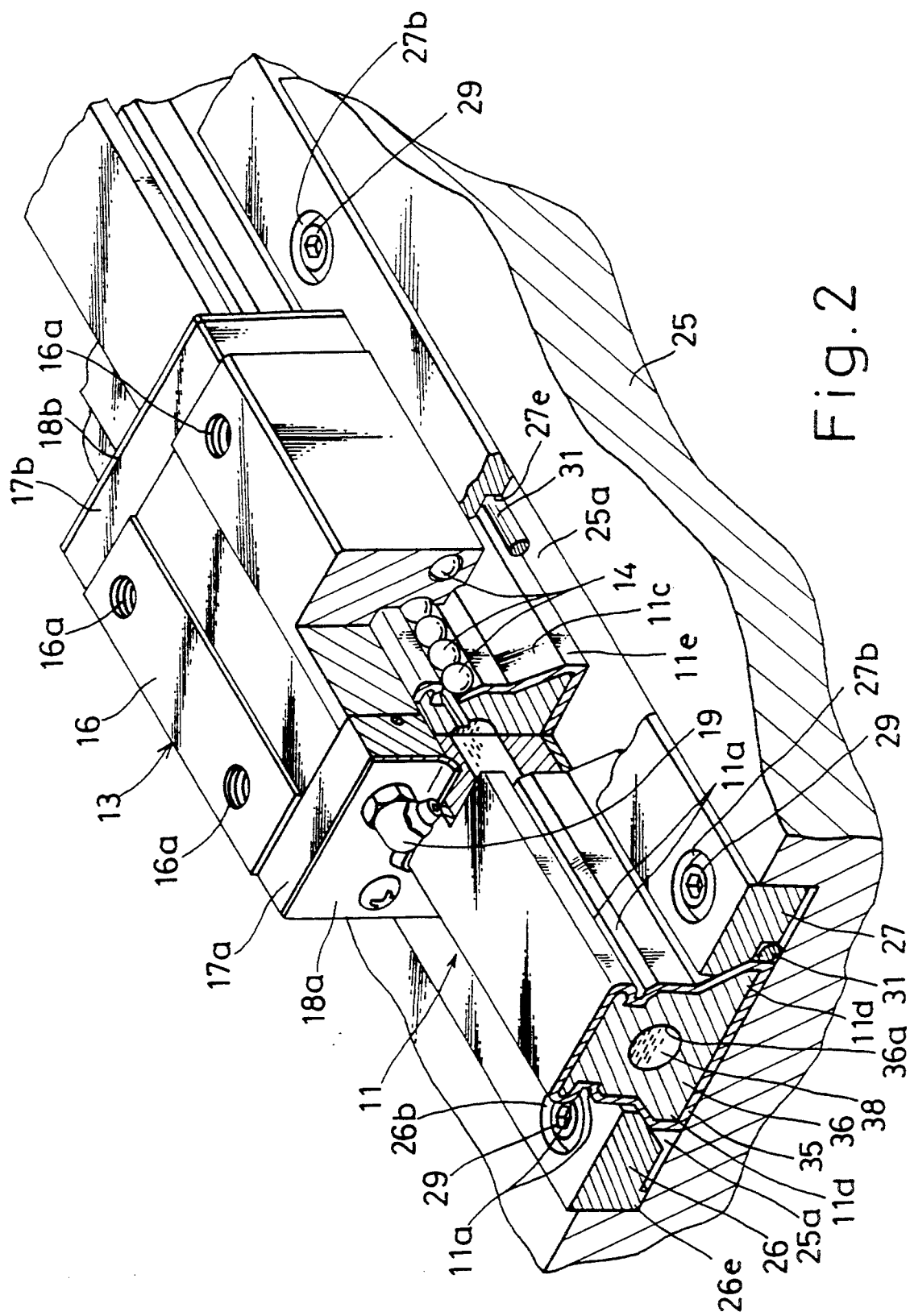
FIG. 2 is a perspective view, containing a partial cross-section, showing the linear motion rolling guide unit as claimed in the present invention mounted on a prescribed base.

As shown in FIGS. 2 and 5, groove 25a, having a roughly rectangular cross section, is formed in base 25 on which track rail 11 is to be fixed, and track rail 11 is placed on a reference surface in the form of bottom surface 25b (shown in FIG. 5) of this groove 25a.

As shown in FIGS. 2 through 5, flanges 11d, having tapered surfaces 11c that gradually widen towards a bottom mounting surface 11b (shown in FIG. 5) of track rail 11, for their upper surfaces, are formed on both sides of the bottom portion of track rail 11. Furthermore, the angles formed between said tapered surfaces 11c and the above-mentioned bottom mounting surface 11b is shown in the symbol $\theta$. This angle $\theta$ is set to a range of roughly 30°–60°.

A pair of clamping members 26 and 27 are arranged within the above-mentioned groove 25a so as to sandwich track rail 11 from both sides. As shown in FIGS. 2 and 5, insertion holes 26a and 27a along with countersunk portions 26b and 27b are arranged in a row in these clamping members 26 and 27 in their lengthwise direction, and are fastened to base 25 by bolts 29 (with hexagonal sockets) inserted into said insertion holes and countersunk portions.

As shown in FIG. 5, contact surfaces 26c and 27c are formed on each of the outsides of both of the above-mentioned clamping members 26 and 27. Together with these making contact with both reference surfaces in the form of right and left inner surfaces 25c and 25d of the above-mentioned groove 25a, tapered surfaces 26d and 27d are formed on the insides that make contact with tapered surfaces 11c of track rail 11. Furthermore, the angles between these tapered surfaces 26d and 27d and bottom surface 25b of groove 25a when not fastened are preferably set to be slightly smaller than the above-mentioned angle $\theta$.

As shown in FIGS. 2 and 5, reference surface 27e is formed in one of the clamping members 27 near the bottom portion of tapered surface 27d. Long, narrow intervening member 31, having a circular cross-section, is juxtapositioned by press fitting between this reference surface 27e and end surface 11e of flange 11d of track rail 11. Furthermore, this intervening member 31 is also shown in FIG. 3. This end surface 11e of flange 11d, namely the surface that engages with said intervening member 31, is set to be perpendicular or roughly perpendicular to the above-mentioned bottom portion mounting surface 11b. Reference surface 27e formed in clamping member 27 is parallel or roughly parallel with said end surface 11e to correspond to said end surface 11e.

In addition, engaging projection 26e, which precisely engages with bottom surface 25b of groove 25a of base 25 and in which a flat projecting end is formed to provide aligning action, is provided on the bottom portion of the other clamping member 26 and near contact surface 26c.

The following provides an explanation of the procedure during mounting of a linear motion rolling guide unit of the above-mentioned construction on base 25.

To begin with, track rail 11 is placed roughly in the center of groove 25a formed in base 25.

Next, one of the clamping members 26 is inserted into the above-mentioned groove 25a, and is fastened with bolts 29 by tightening with a tightening force slightly less than the prescribed tightening force. At this time, contract surface 26c and engaging projection 26e formed in said clamping member 26 make precise and uniform contact over their entire length with inner surface 25c and bottom surface 25b, respectively. Thus, said clamping member 26 is given adequate straightness to allow it to demonstrate aligning action. Later, intervening member 31 and the other clamping member 27 are inserted within groove 25a, and said clamping member 27 is fastened to base 25 with bolts 29 by tightening with a tightening force slightly less than the prescribed tightening force.

When fastening said clamping member 27, the above-mentioned intervening member 31 becomes press fit. In order to accomplish this, the diameter of intervening member 31 juxtapositioned between reference surface 27e of clamping member 27 and end surface 11e of flange 11d of track rail 11 is set to be slightly larger than the distance between said reference surface 27e of clamping member 27 and said end surface 11e of flange 11d of track rail 11, namely the dimension shown with symbol e in FIG. 5.

In said construction, when this clamping member 27 is fastened with bolts 29, pressing force is uniformly applied to the entire length of a reference surface in the form of inner surface 25d of groove 25a via the above-mentioned intervening member 31 and said clamping member 27. Thus, this track rail is corrected following said reference surface allowing its straightness in the horizontal direction to be increased.

Following the above-mentioned procedure, each of bolts 29 is finally tightened at the prescribed tightening force. During this final tightening, since aligning action is performed by engaging projection 26e provided on the other clamping member 26, in a state in which it holds track rail 11 on the opposite side from said clamping member 27 as described above, straightness can be obtained with extremely high precision as a result of track rail 11 being uniformly pressed over its entire length towards clamping member 26 having this aligning property.

More specifically, as a result of the angle formed between tapered surface 26d of clamping member 26 and bottom surface 25b of groove 25a being slightly smaller than angle $\theta$ with tapered surface 11c of track rail 11 as described above, when tightened with a tightening force looser than the prescribed tightening force, only the end of tapered surface 26d of clamping member 26 engages with tapered surface 11c of track rail 11. As a result of then tightening bolts 29 with the prescribed tightening force in this state, clamping member 27 is elastically deformed so that the entire surface of the above-mentioned tapered surface 26d engages with tapered surface 11c of track rail 11. Clamping member 26, having aligning property, is then able to securely hold track rail 11 by means of the reaction force accompanying this elastic deformation.

Furthermore, although the present embodiment indicates the case of setting angles $\theta$ of tapered surfaces 11c on both the right and left sides of track rail 11 to be equal to each other, even in the case of changing angle $\theta$ on the side on which intervening member 31 is provided for design reasons and so forth (for example, by several degrees or less than a minute: including the case of change due to dimensional error), the track rail can still be reliably corrected by the pressing force produced by this intervening member 31.

However, as shown in FIGS. 2 and 5, track rail 11 is composed of shell 35, which composes its surface portion, and filling 36, which was filled into said shell 35. This shell 35 is formed by drawing into a tube made of, for example, steel or steel alloy. In addition, filling 36 is formed by melting a material made of aluminum, non-ferrous metal such as zinc, synthetic resin or cast steel to form a so-called molten metal state, and then cooling to harden after pouring into shell 35.

Thus, track rail 11 is in the form of a duplex structure with respect to the inside and outside. Since it employs a construction in which non-ferrous metal, synthetic resin or cast steel and so forth is filled into the inside, simultaneous to adequately ensuring the rigidity of the track rail, sound muffling effects and anti-vibration effects ape obtained duping operation of sliding unit 13 due to the sound absorbing and vibration absorbing properties of said filled material.

On the other hand, as shown in FIGS. 2 and 5, round hole 36a is formed extending roughly over the entire length of track rail 1 in filling 36 of said track rail 11, and cooling liquid 38 passes through the inside of said round hole 36a. As a result of employing this construction, the temperature rise of track rail 11 during operation is prevented and the temperature is maintained constant. Furthermore, although not shown in the drawings, either a construction in which cooling liquid 38 is injected from one end of track rail 11 and discharged from the other end, or a construction in which cooling liquid injected from one end is circulated and then again discharged from said end, may be employed. In addition, the hole formed in filling 36 for passage of cooling liquid 38 is not limited to round hole 36a shown in the drawings, but rather those of other shapes can naturally also be employed. In addition, their arrangement and set quantity can also be changed as necessary.

Furthermore, with respect to each of clamping members 26 and 27 along with intervening member 31 described above, steel and steel alloy, for example, are selected for their material.

In addition, although solid intervening member 31 is employed in the present embodiment, a hollow one may also be employed provided it ensures adequate rigidity.

Moreover, although a type of linear motion rolling guide unit in which rolling elements in the form of balls 14 circulate within sliding unit 13 accompanying operation, it goes without saying that the present invention can also be applied to other types of linear motion rolling guide units.

In addition, although balls 14 are used for the rolling elements in the present embodiment, a construction may also be employed in which rollers are used. In addition, although one row of balls each is provided on the left and right sides in the present embodiment, a construction may also be employed having two or more rows each.

In addition, the present invention can also be applied similarly in another embodiment in the case of performing curved motion as a result of track rail 11 having a certain curvature.

As has been explained above, according to the present invention, an intervening member is juxtapositioned by press fitting between a reference surface formed in one clamping member and a corresponding flange of a track rail. Thus, during fastening of this clamping member to base, uniform pressing force is applied to the track rail over its entire length by a reference surface in the form of the inner surface of a groove via said intervening member and said clamping member. As a result, said track rail is corrected following said reference surface thereby offering the advantage of improved straightness in the horizontal direction.

What is claimed is:

1. A track rail fixing structure for fixing a track rail, in which flanges, having tapered surfaces that gradually widen towards a bottom mounting surface, for their upper surfaces are provided on both sides of its bottom portion, within a groove having a roughly rectangular cross-section formed in a prescribed base; having: a pair of clamping members arranged on both sides of said track rail, wherein together with contact surfaces that make contact with the left and right inside surfaces of said groove being formed in each of the outsides, tapered surfaces that make contact with said tapered surfaces are formed on the insides; a fastening device that fastens said clamping members to said base; and, an intervening member juxtapositioned between one of the reference surfaces of either of said clamping members and said flanges by press fitting.

2. The track rail fixing structure as set forth in claim 1 wherein an engaging projection, that provides aligning action, is formed on the bottom portion of the other clamping member with respect to said one of either of said clamping members, and engages with the bottom surface of said groove.

3. The track rail fixing structure as set forth in claim 1 wherein the engaging surface between said flange and said intervening member is roughly perpendicular to said bottom mounting surface, and said reference surface is roughly parallel with said engaging surface.

4. The track rail fixing structure as set forth in claim 1 wherein the shape of the cross-section of said intervening member is roughly circular.

5. A linear motion guide unit equipped with: a track rail, in which flanges, having tapered surfaces that gradually widen towards a bottom mounting surface, for their upper surfaces are provided on both sides of its bottom portion; a slider that moves relative to said track rail; and, a track rail fixing structure for fixing said track rail within a groove having a roughly rectangular cross-section formed in a prescribed base; wherein, said track rail fixing structure has: a pair of clamping members arranged on both sides of said track rail, wherein together with contact surfaces that make contact with the left and right inside surfaces of said groove being formed in each of the outsides, tapered surfaces that make contact with said tapered surfaces are formed on the insides; a fastening device that fastens said clamping members to said base; and, an intervening member juxtapositioned between one of the reference surfaces of either of said clamping members and said flanges by press fitting.

6. The linear motion guide unit as set forth in claim 5 wherein an engaging projection, that provides aligning action, is formed on the bottom portion of the other clamping member with respect to said one of either of said clamping members, and engages with the bottom surface of said groove.

* * * * *